| 3,330,798
ALUMINUM PHOSPHATE COATED TITANIUM DI-
OXIDE PIGMENTS FOR MELAMINE AND UREA
FORMALDEHYDE RESINS
Walter Deissmann, Franz Hund, and Paul Langmesser, Krefeld-Bockum, Germany, assignors to Farbenfabriken Bayer Aktiengesellschaft, Leverkusen, Germany, a corporation of Germany
No Drawing. Filed Oct. 15, 1963, Ser. No. 316,468
Claims priority, application Germany, Oct. 18, 1962, F 38,075
6 Claims. (Cl. 260—39)

The present invention is concerned with a proces for increasing the light stability of rutile pigments in melamine or/and urea-formaldehyde resins.

It is known to increase the light stability of rutile pigments in melamine- and urea-formaldehyde resins in that aluminum silicates are deposited on the calcined pigment particles and the pigments subsequently calcined a second time. The second calcining requires temperatures of up to about 800° C. and, therefore, involves a considerable technical expenditure. If it does not take place, then products are obtained with a light stability which is completely inadequate for the mentioned purpose.

It is also known to add to titanium dioxide pigments, before calcination, oxides of various other metals or compounds yielding, during calcination, such oxides, for example, of zinc, magnesium or aluminum, in order, for example, to improve the conversion of anatase into rutile during the calcination or in order to increase the brightening property or the stability of the pigments. However, titanium dioxide pigments pre-treated in this manner are not suitable for use in melamine- and urea-formaldehyde resins because of their insufficient light stability.

We have now found that, with the avoidance of a second calcination, rutile pigments of good light stability in melamine- and urea-formaldehyde resins are obtained in that the pigment particles are calcined in known manner with the addition of other metal oxides or metal oxide-yielding compounds, aluminum phosphate is subsequently deposited on the calcined pigment particles and the pigment particles are only dried at temperatures of about 150 to about 250° C.

It is admittedly known to improve the properties of titanium dioxide pigments for paints by depositing aluminum phosphate on the pigment particles and subsequently drying the particles at about 105° C. however, the pigments obtained in this manner do not show a sufficient light stability in melamine- or urea-formaldehyde resins.

Suitable metal oxides or metal oxide-yielding compounds which can be added to the rutile pigments before the calcination are, for example, the oxides of magnesium, zinc and aluminum, as well as their hydroxides, sulfates, carbonates, etc.

The compounds are expediently added to the washed titanium sulfate hydrolysates obtained in usual manner, before calcination is carried out in known manner, possibly together with other customary additives.

Aluminum phosphates are expediently deposited by mixing an aqueous pigment dispersion with an aqueous solution of an aluminum salt and an aqueous solution of a phosphate and possibly neutralizing the mixture, whereby any desired sequenc of the addition may be used. It has proved to be especially expedient to allow both solutions to run in simultaneously.

The process can be carried out at room temperature. However, in some cases it can be expedient to heat the rutile dispersion too, for example, temperatures between room temperature and about 100° C.

As aluminum salts and phosphates, there may be used for the process, for example, aluminum sulfate, ammonium or potassium aluminum alum, as well as aluminum nitrate or aluminum acetate, and alkali metal phosphates, especially sodium phosphates.

The aluminum salt and the phosphate are preferably added to the pigment dispersion in such amounts that the aluminum phosphate deposit on the pigment particles amounts to about 0.1 to about 10 percent by weight.

The testing of the light stability of the pigments in melamine- or urea-formaldehyde resins is carried out in known manner. For this purpose, laminated sheets are produced in the following way:

125 g. of the pigment are dispersed in 100 g. of a solution which was obtained by dissolving 100 g. of a soluble melamine formaldehyde resin-precondensate produced by reacting melamine and 40% aqueous formaldehyde in aqueous alkaline medium, in a mixture of 60 milliliters water and 50 milliliters ethyl alcohol at 60–70° C., and intensively mixed during 5 minutes.

Four sheets of filter paper (4, 8 x 10 cm.) are dipped into the resulting dispersion and the excess of fluid is stripped from the paper sheets after removing from the dispersion. Thereafter the sheets are dried for 10 minutes at 100° C. and then treated with an identical but non-pigmented melamine formaldehyde resin solution as described above. After a further heating of the sheets for 20 minutes to about 140° C. the four sheets are pressed together 13 minutes at about 149° C. and a pressure of 105 kg./cm.$^2$, thereafter cooled under the same pressure to 40° C. and then removed from the press.

The laminated sheets thus obtained are irradiated on a rotating plate with circularly arranged UV lamps. Before the irradiation, the remissions $R_x$ (red), $R_y$ (green) and $R_z$ (blue) are measured with a spectral remission photometer, after the irradiation, the remissions are again measured at the same places and the percentage reduction of remission for red, green and blue $(r, g, b)$ determined. The average value $$V = \frac{r+g+b}{3}$$

is given as a percentage as a measure of the discoloration.

The following Examples 2 to 4 are given for the purpose of illustrating the present invention, Example 1 being given for the purpose of comparison:

EXAMPLE 1

*Known technique*

(a) A normal titanium dioxide pigment in the rutile modification is, after wet grinding, dispersed in such an amount of water that the solids content amounts to about 20%. A solution silicate solution containing 54.5 g. of silicon dioxide per liter and an aluminum sulfate solution containing 100 g. of aluminum oxide per liter are simultaneously added to this dispersion which has been heated to 60° C., within a period of 45 minutes, with vigorous stirring, so that the added amount of silicon dioxide amounts to 2.00% and of aluminum oxide to 4.00%, both referred to the titanium dioxide. Within a period of 30 minutes, a pH value of 7.5–7.7 is then adjusted with a sodium hydroxide solution, the mixture stirred for a further 30 minutes, the treated pigment subsequently filtered off, washed and dried at about 150–200° C. The pigment is then worked up to laminated sheets as described above. The V-value of the pigment amounts to 13.8%.

(b) By the addition of aluminum hydroxide to a washed titanium sulfate hydrolysate, a rutile pigment with 0.3% aluminum oxide, referred to titanium dioxide is produced during calcination. The V-value of this pigment amounts to 16.2%.

(c) A sodium phosphate solution containing 25.0 g. of phosphorus pentoxide per liter and an aluminum sulfate solution containing 100 g. of aluminum oxide per liter is added simultaneously, with a period of 45 minutes, with vigorous stirring, to the rutile dispersion produced and heated at 60° C., as stated above under (a), so that the added amount of phosphorus pentoxide amounts to 2.000% and of aluminum oxide to 1.437%, both referred to titanium dioxide. A pH value of 7.5-7.7 is then adjusted within a period of 30 minutes with a sodium hydroxide solution, the mixture stirred for a further 30 minutes and worked up as under (a). The V-value of the pigment obtained amounts to 9.8%.

EXAMPLE 2

*Technique according to the invention*

By the addition of aluminum hydroxide to a washed titanium sulfate hydrolysate, there is produced, during calcination, a rutile pigment containing 0.3% of aluminum oxide referred to titanium dioxide. According to the invention a treatment of the wet-ground and dispersed pigment takes place as in Example 1(c). The V-value of the pigment obtained amounts to 3.3%.

EXAMPLE 3

*Technique according to the invention*

By the addition of magnesium oxide to a washed titanium sulfate hydrolysate, there is produced, during calcination, a rutile pigment containing 0.5% of magnesium oxide, referred to titanium dioxide. According to the invention a treatment of the wet-ground and dispersed pigment takes place as in Example 1(c). The V-value of the pigment obtained amounts to 3.3%.

EXAMPLE 4

*Technique according to the invention*

By the addition of zinc oxide to a washed titanium sulfate hydrolysate, there is produced, during calcination, a rutile pigment containing 1.0% zinc oxide, referred to titanium oxide. According to the invention a treatment of the wet-ground and dispersed pigment takes place as in Example 1(c). The V-value of the pigment obtained amounts to 7.4%.

We claim:

1. In the method of producing rutile pigments by a process involving only a single calcination comprising (a) mixing uncalcined titanium dioxide with another metal oxide or metal compound forming an oxide in step (b) said metal being selected from the group consisting of magnesium, zinc or aluminum, (b) calcining the mixture and (c) depositing from about 0.1 to about 10% by weight aluminum phosphate on the calcined particles, the improvement comprising drying the particles obtained in step (c) at a temperature of between about 150 to about 250° C. to obtain, in a single calcination, pigments of increased light stability in melamine- and urea-formaldehyde resins.

2. The method of claim 1 wherein the metal oxide or metal compound is a member selected from the group consisting of oxides, hydroxides, sulfates or carbonates of magnesium, zinc or aluminum.

3. The method of claim 1 wherein step (c) is conducted at a temperature up to 100° C.

4. Process according to claim 1, wherein in step (b) the aluminum phosphate is disposed on the particles by the addition of an aqueous solution of an aluminum salt and an aqueous solution of a phosphate to an aqueous dispersion of the calcined particles.

5. Rutile pigments obtained by the process of claim 1.

6. Melamine-formaldehyde resins and urea-formaldehyde resins containing the rutile pigments of claim 5.

References Cited

UNITED STATES PATENTS

| | | | |
|---|---|---|---|
| 2,668,776 | 2/1954 | Miller | 106—300 |
| 2,689,162 | 9/1954 | Lee et al. | 260—39 |
| 3,141,788 | 7/1964 | Whately | 106—300 |
| 3,169,074 | 2/1965 | Holbein | 106—300 |
| 3,203,818 | 8/1965 | Rechmann et al. | 106—300 |
| 3,251,705 | 5/1966 | Rieck et al. | 106—300 |

TOBIAS E. LEVOW, *Primary Examiner.*

S. E. MOTT, *Assistant Examiner.*